US005709450A

United States Patent [19]

Francis et al.

[11] Patent Number: 5,709,450

[45] Date of Patent: Jan. 20, 1998

[54] HIGH INTENSITY DISCHARGE AUTOMOTIVE LAMP SOCKET

[75] Inventors: Michael Eugene Francis, Warren, Ohio; Dany Paul Delaporte, Lake Orion, Mich.; Richard Charles Brennan, III, Canoga Park; Russell Mistretta Abbott, Riverside, both of Calif.

[73] Assignees: General Motors Corporation, Detroit, Mich.; Hughes Aircraft Company, Los Angeles, Calif.

[21] Appl. No.: 579,485

[22] Filed: Dec. 27, 1995

[51] Int. Cl.[6] .......... B60Q 1/00

[52] U.S. Cl. .......... 362/61; 362/263; 313/318.01; 439/602; 439/611

[58] Field of Search .......... 362/61, 263, 226, 362/296; 313/318.01, 318.08, 318.09, 318.1, 318.11, 318.12, 318.07; 439/237, 617, 619, 611, 602, 612, 613, 614

[56] References Cited

U.S. PATENT DOCUMENTS

| | | | |
|---|---|---|---|
| 5,059,855 | 10/1991 | Irisawa et al. | 313/318.01 |
| 5,173,062 | 12/1992 | Uchida | 439/617 |
| 5,177,397 | 1/1993 | Nagasawa et al. | 439/612 |
| 5,180,218 | 1/1993 | Ohshio | 362/61 |
| 5,216,318 | 6/1993 | Van Dulmen et al. | 362/226 |
| 5,243,501 | 9/1993 | Makita et al. | 362/61 |
| 5,432,399 | 7/1995 | Nagasawa et al. | 313/318.01 |

*Primary Examiner*—Thomas M. Sember
*Attorney, Agent, or Firm*—Vincent A. Cichosz; Ernest E. Helms

[57] ABSTRACT

An arrangement of an automotive lamp assembly is provided including a reflector housing with a central opening; a discharge light assembly mounted to the reflector through the opening; a base supporting the discharge light assembly in the reflector, the base having a concentric conductor connected to the discharge light assembly at one end and a pin first terminal on an opposite end of the first conductor, and the base having a second eccentric conductor connected to the discharge light assembly on one end with a collar connected on an opposite end; a socket sealed with the base, the socket having a concentric conductor for mating with the base concentric conductor, the socket concentric conductor having a collar terminal at a first end toward the base and a blade terminal at a second opposite end, the socket also having an eccentric conductor having a collar terminal at a first end toward the base and a blade end at a second opposite end; an annular high voltage insulation member surrounding the first end of the socket concentric conductor; first and second tubular passages respectively extending through the socket housing intersecting with the blades of the concentric and eccentric socket conductors; first and second high voltage insulated wire conductors with terminals for mating with the socket conductor terminals; and seal boots sealing the first and second lead wires.

2 Claims, 3 Drawing Sheets

HIGH INTENSITY DISCHARGE AUTOMOTIVE LAMP SOCKET

FIELD OF THE INVENTION

The field of the present invention is that of automotive lamps utilizing high intensity discharge (HID) lighting.

BACKGROUND OF THE INVENTION

The main components in an HID headlamp system are a ballast, a starter and a discharge light assembly (DLA). The ballast accepts systems DC voltage and regulates AC voltage to the DLA. The starter amplifies the ballast voltage when the lamp assembly is first turned on and thereafter turned off. The DLA is sometimes referred to as a lamp. The DLA must be in a sealed environment. In some HID headlamp systems, the starter is physically attached and hard wired to the back of the DLA. The above arrangement allows for a design which does not have to conduct high voltage ignition pulses between the starter and the DLA. The drawbacks of this arrangement include a large space requirement behind the headlamp assembly in an automotive engine compartment. Also, the starter adds weight at a back end of the DLA which may affect DLA longevity by amplifying vibrations to the DLA during vehicle operation.

In other systems, a separate starter is connected to the DLA through a connector but requires the headlamp assembly to seal around the connector.

It is desirable to provide a system for which a simple socket connector is provided which will allow sealing the DLA from water intrusion and allow the starter to be located remotely from the DLA.

SUMMARY OF THE INVENTION

The present invention provides a vehicle headlight system wherein the starter may be placed within the ballast. A socket connector is now mated to the DLA, which is mounted in the sealed environment. The socket connector will provide a seal connection with the DLA and also be able to handle high voltage pulses in the range of 23,000 to 30,000 volts. Since the starter no longer has to be adjacent to the DLA, space in the engine compartment is enhanced, and the DLA will have increased reliability due to the reduction in vibrational problems generated by having the starter physically joined to the DLA. Additionally, in a preferred embodiment, the socket connector may make electrical connections at a right angle for better wire routing and enhanced ergonomics.

DESCRIPTION OF THE PREFERRED EMBODIMENT

Figure 1:
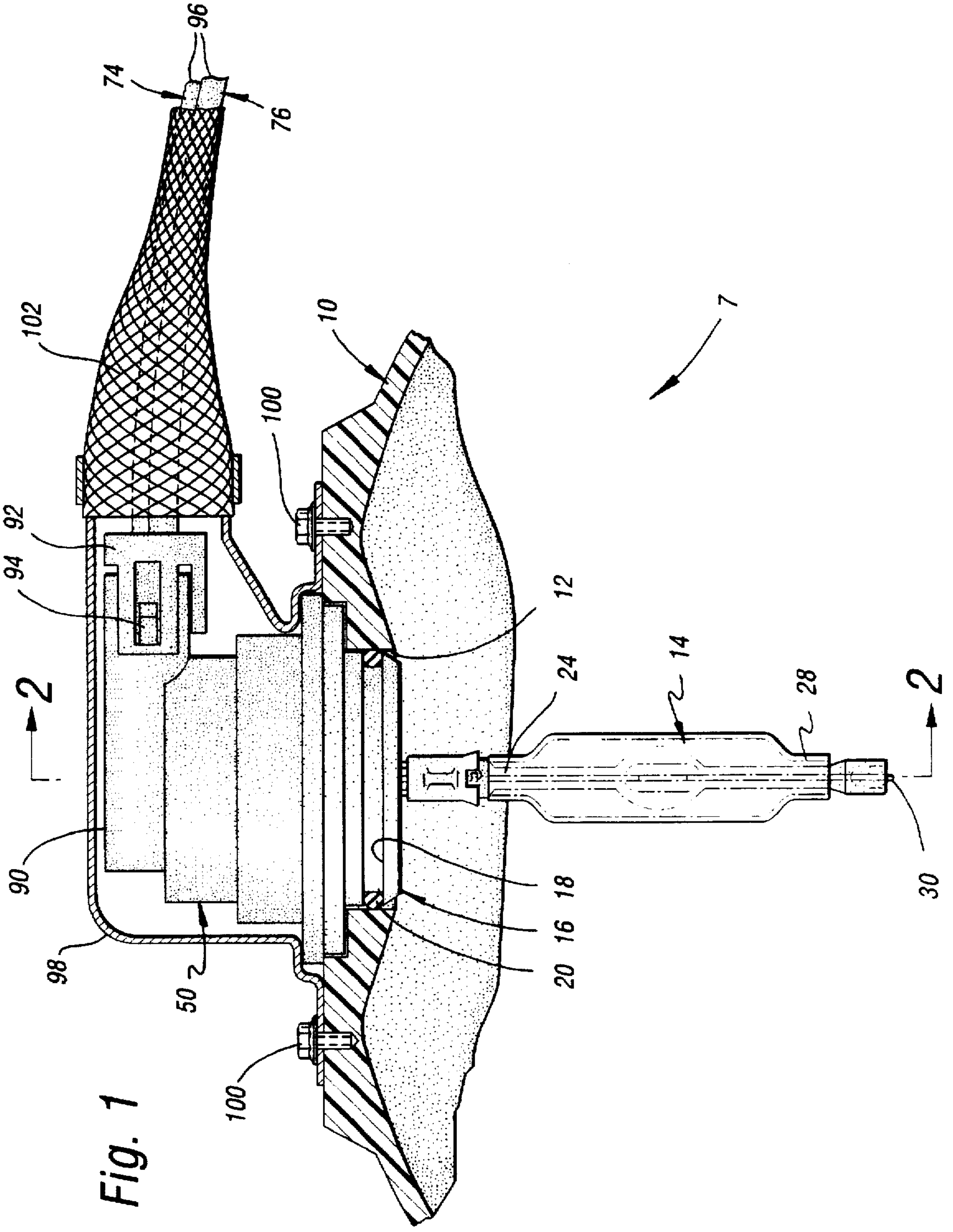
FIG. 1 is a section view of a preferred embodiment automotive lamp assembly according to the present invention.
Figure 3:
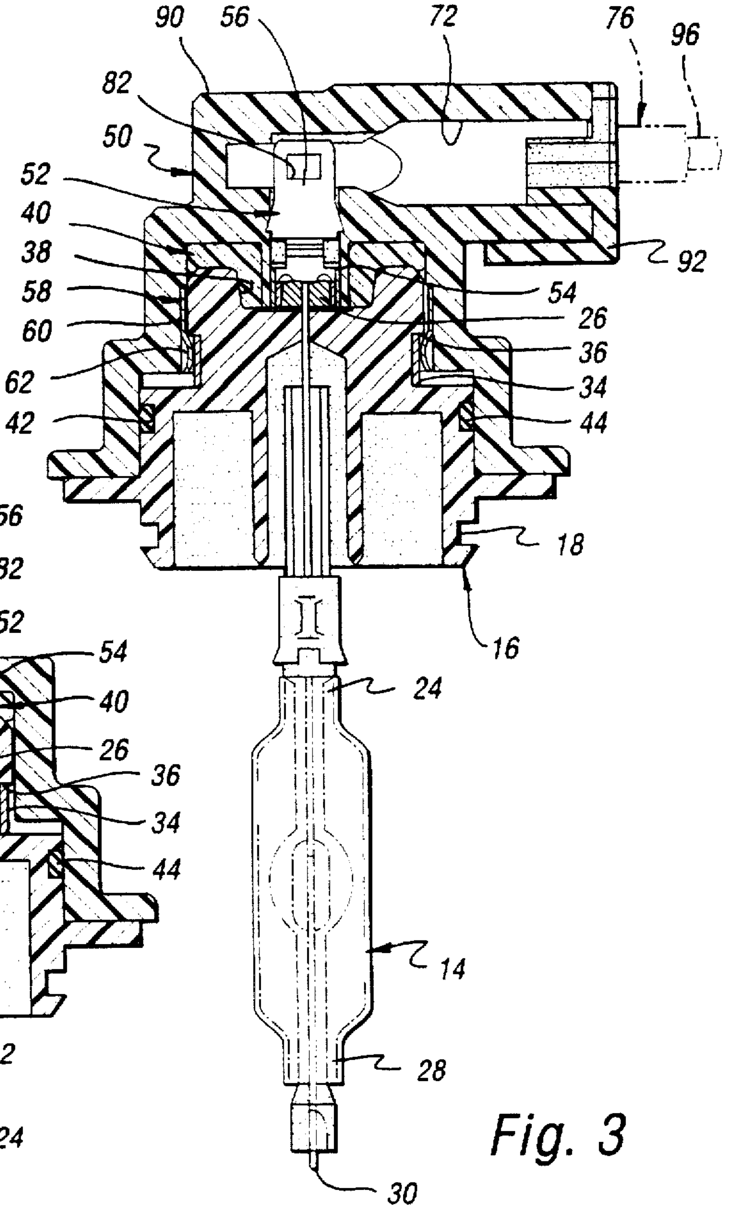
FIG. 3 is a view taken along line 3—3 of FIG. 2.
Figure 2:
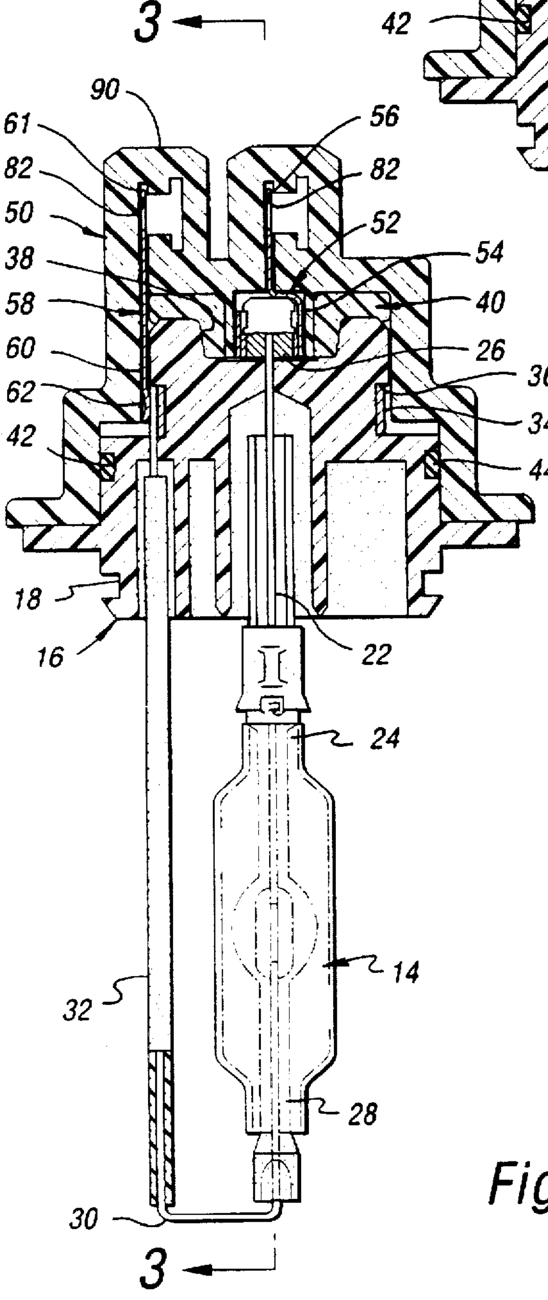
FIG. 2 is a view taken along line 2—2 of FIG. 1.
Figure 4:
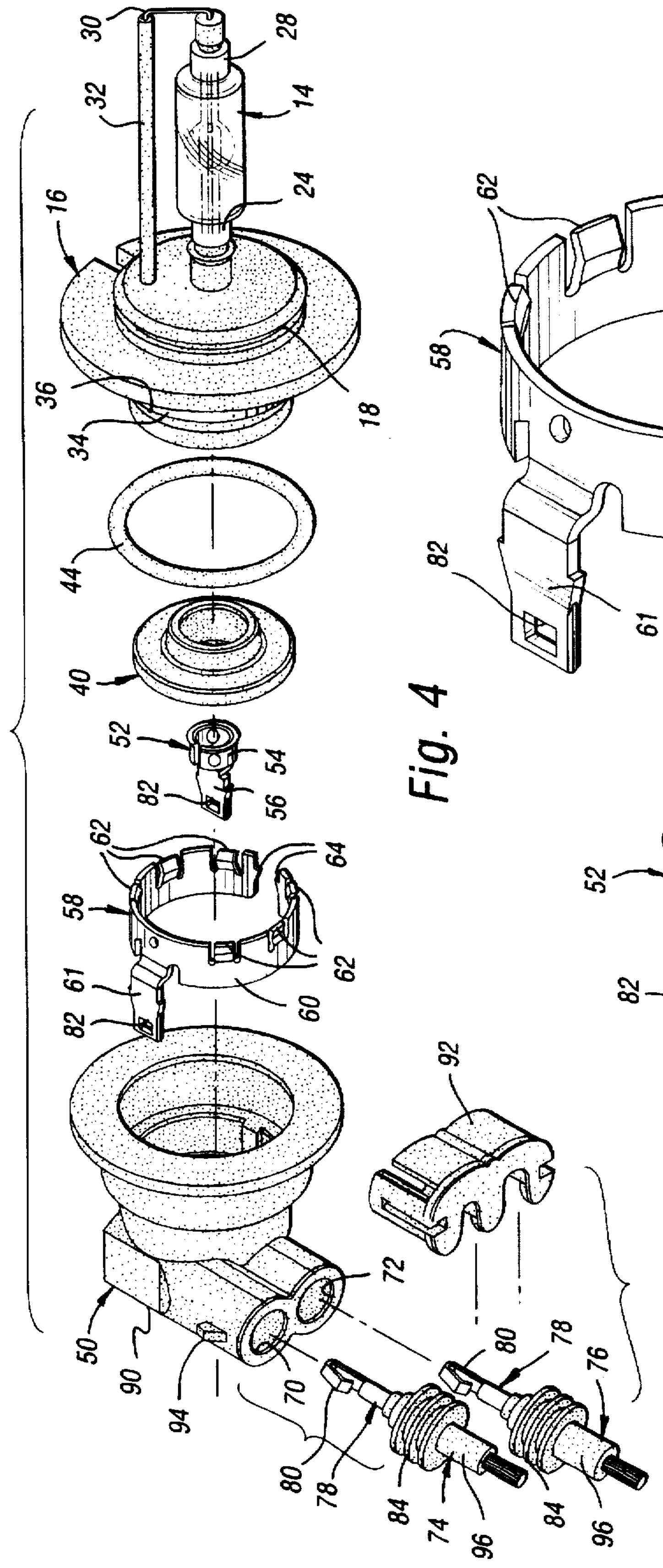
FIG. 4 is an exploded view of the various components of the present invention.
Figure 5:
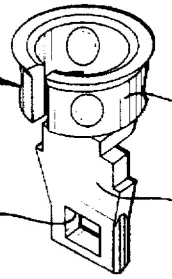
FIGS. 5 and 6 are enlarged perspective views of the socket terminals shown in FIGS. 1 through 4.
Figure 6:
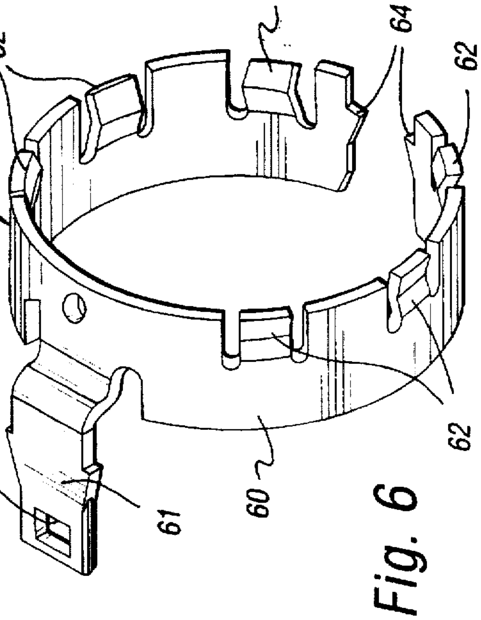

Referring to FIGS. 1–6, the automotive headlamp assembly 7 according to the present invention has a reflector housing 10. The reflector housing 10 has a central opening 12. Mounted within the central opening 12 of the reflector housing is an HID bulb, more commonly referred to as a discharge light assembly 14. The discharge light assembly 14 gives off about 3200 lumens of light under a normal operating voltage of 85 volts and current of 0.412 amps. Typical discharge light assemblies 14 are manufactured by Phillips or Osram. To start the discharge, a current of approximately 23,000 to 30,000 volts must be initially supplied by a high voltage starter unit.

To prevent voltage losses and also prevent fluids from contacting the DLA 14 when it is hot, the environment that the DLA is placed in is sealed.

Mounting the DLA 14 in the central opening 12 of the reflector housing 10 is a base 16. The base 16 has an O-ring groove 18 allowing for placement of an O-ring 20 to prevent the entry of moisture or other contaminants into the sealed environment which surrounds the DLA 14. The base 16 has a first concentric conductor 22. The first base conductor connects end 24 of the DLA. An opposite end of the first conductor 22 is connected to a cap or pin 26. A far end 28 of the DLA is connected to a second eccentric conductor 30. Conductor 30 is provided with a voltage insulating layer 32 and is connected at its first end which penetrates into the base 16 with a collar terminal 34. The collar terminal 34 extends substantially along the whole periphery of an annular groove 36 provided in the base 16. The base 16 also has a general axial depression 38 which accepts a voltage isolation member 40 which encircles the connection pin 26. The base 16 additionally has a groove 42 and an O-ring 44 which provide sealing for the base with respect to a socket 50. Typically, the base 16 will be supplied by the DLA manufacturer and will be made from a polyphenylene sulfide plastic material.

Rotatably mounted on the base 16 is the socket 50. The socket 50 has a first concentric conductor 52 having a collar 54 at one end and a blade terminal 56 at an opposite end. The collar 54 of the first conductor 52 is provided for electrically mating with the pin 26 of the base first conductor 22. The socket 50 also has a second conductor 58 with a collar terminal 60 at an end adjacent to the base 16 and a blade terminal 61 at an opposite end. The collar terminal 60 has a series of six radially inwardly directing contact fingers 62. This ensures continuous contact with the collar 34 provided in the base 16. Continuous electrical contact is critical since interruptions of current of as low as 10 microseconds may cause an interruption of the DLA 14. The collar terminal 60 also has two barbs 64 which help ensure proper retention of the first conductor 58 within the socket 50. In a similar fashion, optionally the first conductor member 52 terminal collar 54 has stamped bumps to help ensure continuous contact with the pin 26. (Note: The bumps may be eliminated to lower insertion forces.) Pin 26 is welded with the base first conductor 22. In a like manner, second conductor 30 is welded with the ring terminal 34.

The socket also has two tubular openings 70 and 72 which allow for entry of lead wires 74 and 76 which are connected to a starter (not shown). The lead wires have appropriately crimped to them terminals 78 which have a nib 80. The nibs 80 fit within matching apertures 82 provided in the blade terminals 56 and 61, respectively. Boot seals 84 seal the lead wires 74 and 76 within the tubular openings 70 and 72, respectively. Openings 70 and 72 extend at right angles with respect to the main axis of the base 16 and the socket 50 to provide as great a space possible in the region rearward of surface 90 of the socket 50. A secondary lock and terminal position assurance cap 92 snaps over lock ramps 94 (only one shown) to help ensure the retention of the seal boots 84 within the openings 70 and 72. The seal boots allow the lead wires 74 and 76 to be sealed without the use of a poring compound, which can easily crack and allow moisture to enter. Additionally, since the insulation 96 of the lead wires is often Teflon, silicon or a combination thereof, the boots 84 can seal where adhesive sealing was previously unavailable due to nonadherence to the insulation. The insulation is not typical rubber insulation due to the high voltage dielectric strength requirement.

It is important to allow the socket 50 to rotate with respect to the base 16 to allow for the proper routing of the lead wires 74 and 76. The socket 50 may rotate 360 degrees in an infinite manner with respect to the base 16. Proper routing is an even greater cost consideration due to the high relative cost of insulating the lead wires 74 and 76 due to their high voltages during the startup period. However, during vehicle assembly, the assembler will determine the optimum angular position of the socket 50 with respect to the base 16. Upon that determination, a cover 98 made of electrically conductive material such as nickel-clad iron mesh will be rotated until it is tied down by fasteners 100, which firmly affix the socket to the reflector housing 10. A wire mesh sheet 102 provides additional protection about the wires 74 and 76 and also shields from any electromagnetic radiation.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. An arrangement of an automotive lamp assembly comprising:

a reflector housing with a central opening;

a discharge light assembly mounted to the reflector housing through the opening of the reflector housing;

a base supporting the discharge light assembly in the opening of the reflector housing, the base having a concentric first conductor connected to the discharge light assembly at one end and a pin first terminal on an opposite end of the first conductor, and the base having a second eccentric conductor connected to the discharge light assembly at one end and to a collar on an opposite end;

a socket sealed with the base, the socket having a first concentric conductor for mating with the base first conductor, the socket first conductor having a collar terminal at a first end toward the base and a respective bide terminal at a second opposite end, the socket also having a second eccentric conductor having a collar terminal at a first end toward the base and a respective blade terminal at a second opposite end;

an annular dielectric high voltage insulation member surrounding the collar terminal of the socket first conductor;

first and second tubular passages respectively extending through the socket intersecting with the respective blade terminals of the first and second socket conductor;

first and second high voltage insulated wire conductors with terminals for mating with the terminals of the socket conductors; and seal boots sealing the first and second lead wires within the respective first and second tubular passages.

2. An automotive lamp assembly as described in claim 1 wherein the tubular passages are generally perpendicular to the base first and second conductors.

* * * * *